Figure 1:
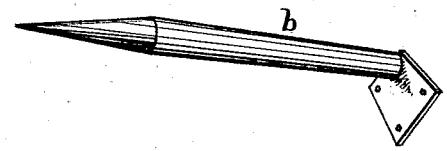
Figure 2:
Figure 3:
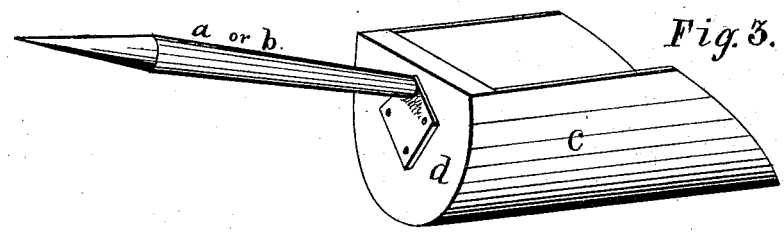

G. W. WOODWARD.
SUGAR-SCOOP.

No. 171,252. Patented Dec. 21, 1875.

Witnesses:

Inventor:
George W. Woodward.

UNITED STATES PATENT OFFICE.

GEORGE W. WOODWARD, OF FAYETTEVILLE, NORTH CAROLINA, ASSIGNOR OF ONE-HALF HIS RIGHT TO GEORGE P. McNEILL, OF SAME PLACE.

IMPROVEMENT IN SUGAR-SCOOPS.

Specification forming part of Letters Patent No. 171,252, dated December 21, 1875; application filed September 10, 1875.

*To all whom it may concern:*

Be it known that I, GEORGE W. WOODWARD, of Fayetteville, in the county of Cumberland and State of North Carolina, have invented a new and Improved Handle for Scoops; and I do hereby declare that the following is a full, clear, and exact description of the same, reference being had to the accompanying drawings, making a part of this specification.

The object of my invention is to produce a cheap, durable, and convenient handle for scoops, as there has been and now exists a great need for a scoop-handle which will answer the purpose of a chisel, or any pointed instrument, for breaking up hard sugars, which will not easily or readily yield to the force of a scoop. Besides, the edges of scoops are easily battered, and soon wear out from the hard pressure upon refined sugars.

In order to practice my improvement, I construct a handle made of round iron, say three-fourths or one inch in diameter. The handle is pointed with steel, and shaped in the same manner as a chisel or spike, and is attached or fastened to the scoop by means of a flange, which fits up against it, and is riveted and soldered on. (See drawing forming a part of this specification.)

If desired, the handle can be made of malleable cast-iron, and can be made hollow. To protect the handle from rust, it can be tinned over in the same manner as sauce-pan handles and bucket-ears, which will afford it protection.

Any material can be used in constructing the handle, and any metal or composition used to protect it against rust, as may be deemed best.

It is a well-known fact that nearly all sugars which pass through a refining process become incrusted in the barrel, and it is oft-times the case that great difficulty is experienced in getting the sugar out. A chisel has to be used to break it up. Then, when this is done the chisel is removed, set aside, or sometimes misplaced, so that it cannot be found when needed.

My device is to form a handle in all respects shaped and made to answer the purpose of a chisel or a spike, which will be at all times ready for use, and attached to the scoop I have combined all the appliances necessary for handling hard sugars.

Having described the nature of my invention, what I claim, and desire to secure by Letters Patent, is—

As a new article of manufacture, the scoop C, provided with a pointed metallic handle, A, as and for the purpose described.

GEORGE W. WOODWARD.

Witnesses:
W. F. TAYLOR,
A. J. BRANNAN.